United States Patent [19]
Truckenbrod et al

[11] Patent Number: 5,295,364
[45] Date of Patent: Mar. 22, 1994

[54] REFRIGERATION PULL-DOWN TECHNIQUE

[75] Inventor: Greg Truckenbrod, Fridley, Paul C. Wacker, Plymouth, both of Minn.

[73] Assignees: Thermo King Corporation; Honeywell, Inc., both of Minneapolis, Minn.

[21] Appl. No.: 91,465

[22] Filed: Jul. 14, 1993

Related U.S. Application Data

[63] Continuation of Ser. No. 861,244, Mar. 31, 1992, abandoned, which is a continuation of Ser. No. 641,293, Jan. 15, 1991, abandoned.

[51] Int. Cl.$^5$ .............................................. F25B 1/00
[52] U.S. Cl. ........................................ 62/209; 62/229
[58] Field of Search .................. 62/229, 209, 208, 213, 62/228.5

[56] References Cited

U.S. PATENT DOCUMENTS

| | | | |
|---|---|---|---|
| 3,964,676 | 6/1976 | Rooks et al. | 236/47 X |
| 4,021,213 | 5/1977 | Neidhardt et al. | 62/229 X |
| 4,060,123 | 11/1977 | Hoffman et al. | 236/47 X |
| 4,509,586 | 4/1985 | Watabe | 62/213 X |
| 4,589,060 | 5/1986 | Zinsmeyer | 364/148 |
| 4,663,725 | 5/1987 | Truckenbrod et al. | 364/505 |
| 4,715,190 | 12/1987 | Him et al. | 62/230 |
| 4,742,689 | 5/1988 | Lowes | 62/197 |
| 4,918,932 | 4/1990 | Gustafson et al. | 62/89 |
| 4,977,752 | 12/1990 | Hanson | 62/213 X |

FOREIGN PATENT DOCUMENTS 0299361 of 0000 European Pat. Off. .
2059642 of 0000 United Kingdom .

*Primary Examiner*—William E. Wayner
*Attorney, Agent, or Firm*—John L. Rooney

[57] ABSTRACT

Apparatus for and method of rapidly bringing a controlled space to a desired temperature. The technique is particularly applicable to the maintenance of controlled temperature spaces for the transportation of perishable cargo, such as in refrigeration trucks. Immediately following completion of the loading process, it is desirable to bring the internal temperature of the controlled space to the proper operating point as quickly as possible to retard spoilage. However, it is necessary to avoid unacceptable overshoot to prevent damage to the cargo by freezing. The disclosed system employs multiple sensors and a control algorithm to permit pull down to occur as rapidly as possible without unacceptable overshoot.

15 Claims, 3 Drawing Sheets

REFRIGERATION PULL-DOWN TECHNIQUE

CROSS REFERENCE TO CO-PENDING APPLICATIONS

This is a continuation of co-pending U.S. application Ser. No. 07/861,244, filed Mar. 31, 1992, which is a continuation of U.S. application Ser. No. 07/641,293 filed Jan. 15, 1991.

U.S. Pat. application Ser. No. 07/641,292, now abandoned filed Jan. 15, 1991, entitled "Refrigeration Temperature Control System" is assigned to the assignees of the present invention and incorporated herein by reference.

BACKGROUND OF THE INVENTION

1. Field of the Invention

The present invention relates generally to temperature control systems, and more particularly, relates to systems to initiate temperature control of a refrigerated space.

2. Description of the Prior Art

It is known in the art to control the temperature of a space used to store or transport perishable materials such as foodstuffs. In controlling temperature in such a space, it is most difficult when the space is used to transport the perishable materials, such as with refrigeration trucks.

Much of the difficulty arises because of the change in thermal loading caused by large changes in the ambient with respect to time of day, geographical location, and weather conditions. A particular problem results from the initial loading of the refrigeration truck. It is desirable to pull down the temperature as quickly as possible to provide maximum retardation of spoilage. However, care must be exercised not to over shoot the target temperature anywhere within the refrigerated space, thereby freezing some or all of the cargo.

U.S. Pat. No. 4,715,190 discusses a rudimentary temperature control system. An advanced microprocessor based temperature control system is taught in U.S. Pat. No. 4,663,725, issued to Truckenbrod et. al., and incorporated herein by reference. The Truckenbrod et. al., system employs temperature sensors for the return and discharge of air. A fault recovery algorithm permits the system to switch between sensors as appropriate. U.S. Pat. No. 4,589,060, issued to Zinsmeyer, also discusses a microprocessor based temperature control system.

Techniques for control of the refrigeration process are described in U.S. Pat. Nos. 4,742,689 and 4,934,155, issued to Lowes. These Lowes references show control of temperature through the use of hot gas bypass of the compressor in an attempt to maintain a more constant compressor speed.

A highly sophisticated system for temperature control is taught in U.S. Pat. No. 4,918,932 issued to Gustafson et. al., and incorporated herein by reference. This system uses an integrated average of the outputs of a discharge sensor and a return sensor to control the refrigeration apparatus. The algorithm of this system treats the initial pull down of the temperature following cargo loading in the same manner as the steady state.

SUMMARY OF THE INVENTION

The present invention overcomes the disadvantages of the prior art by directly addressing the problem of pull down within a temperature control system. The system employs temperature sensors to monitor both the discharge and return air temperatures. The pull down mode may be terminated by a sensed condition from either sensor.

In the preferred mode, any one of three separate conditions can terminate the pull down mode. If the discharge temperature is less than the setpoint minus ten, if the return temperature is less than the setpoint plus one, or if the time integral of discharge temperature lower than the floor temperature exceeds 150 degree minutes, the pull down mode is terminated.

The first two (2) conditions result in normal termination of the pull down mode. Either situation may occur first depending upon thermal loading conditions, initial cargo temperature, and other factors at the time of cargo loading. With either termination condition, maximum protection is afforded the cargo. Because the pull down mode involves maximum cooling capacity from the refrigeration unit, minimum exposure to spoilage is achieved. On the other hand, because both discharge and return air is monitored, protection from partial freezing is enhanced.

The third termination condition (i.e. degree minutes exceeding 150) may occur during equipment malfunction, failure to properly seal the refrigerated space, or inadequate refrigeration capacity for a given cargo. More often, this will result during high ambient and/or high heat loads.

In the preferred mode, and not intended to be limiting of the present invention, the condition causing termination of the pull down mode may be used to initiate a particular method for long-term operational monitoring and control of the refrigerated space. For example, termination based upon the discharge air sensor may initiate long-term monitoring of the refrigerated space from the discharge sensor. Similarly termination based upon the return air sensor may initiate long-term monitoring from the return air sensor.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
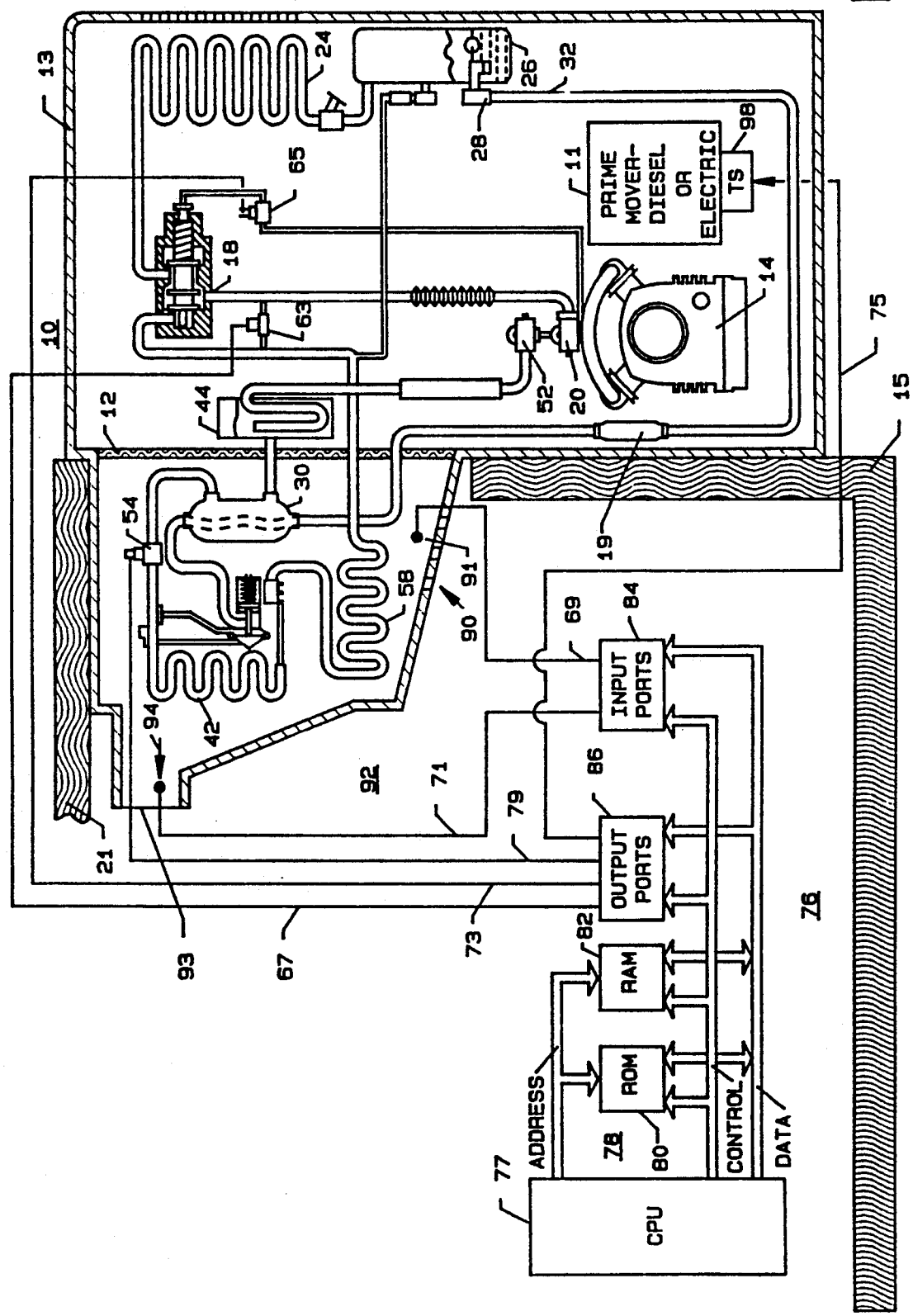
FIG. 1 is a schematic diagram of a refrigeration system employing the present invention.

FIG. 1 is a schematic view of a refrigeration system 10 employing the present invention. In the preferred mode, and not to be interpreted as limiting of the present invention, refrigeration system 10 is incorporated into a refrigeration truck (not shown). Starboard wall 15 and port wall 21 are partially shown encompassing refrigerated space 92. Aperture 12 is located in the forward wall of the refrigerated space for mechanical access of the refrigeration components as shown. Digital control system 76 is shown within refrigerated space 92 as a matter of convenience in illustration only. In actual operation, digital control system 76 is located outside of refrigerated space 92.

Housing 13 encompasses those components of the refrigeration system housed outside of refrigerated space 92. It contains prime mover 11 which is a source of mechanical motion to operate compressor 14. Prime mover 11 may use a number of techniques, but is preferably either a diesel engine or electric motor. The speed of prime mover 11 is controlled by digital control system 76 via cable 75 and interface 98 as is explained in more detail below.

Condenser coil 24, fed by compressor 14 via three-way valve 18, serves to exchange heat with the environment through the opening shown in housing 13. This exchange may be dissipation of excess heat in the cooling modes or acquisition of heat for the heating modes. Reservoir 26 collects excess liquid coolant and dispenses it through tubing 32 via exit valve 28 as required. Tubing 32 contains dryer 19. Valves 20 and 52 provide for input to and output from compressor 14. Reservoir 44 is placed in the suction line as shown.

Return air from refrigerated space 92 enters the evaporator coil housing via vent 90 and corresponding vents (not shown) in the bottom of the housing. Evaporation coils 42 and 58 cool or heat the return air on the way to discharge port 93. Temperature sensor 91 monitors the temperature of the return air and temperature sensor 94 monitors the temperature of the discharge air. Heat exchanger 30 connects evaporation coils 42 and 58 to the suction line. Modulation valve 54 controls suction line flow in response to digital control system 76 connected via cable 79. Control of modulation valve 54 permits adjustment of the refrigeration system capacity in operation.

Digital control system 76 is a microprocessor controller operated by firmware/software as described in more detail below. Central processing unit 77 runs the control firmware/software. Read only memory 80 is suitable for storage of the control firmware/software and various numerical constants. Random access memory 82 is used for storage of variables and for input and output buffering. Output ports 86 couple to interface 98 via cable 75 to control prime mover 11, to the heat/cool pilot solenoid controlling the three-way heat/cool valve 18 via cable 73, hot gas bypass valve 63 via cable 67, and to modulation valve 54 via cable 79. Input ports 84 couple to return air temperature sensor 91 via cable 69 and to discharge air temperature sensor 94 via cable 71.

Figure 2:
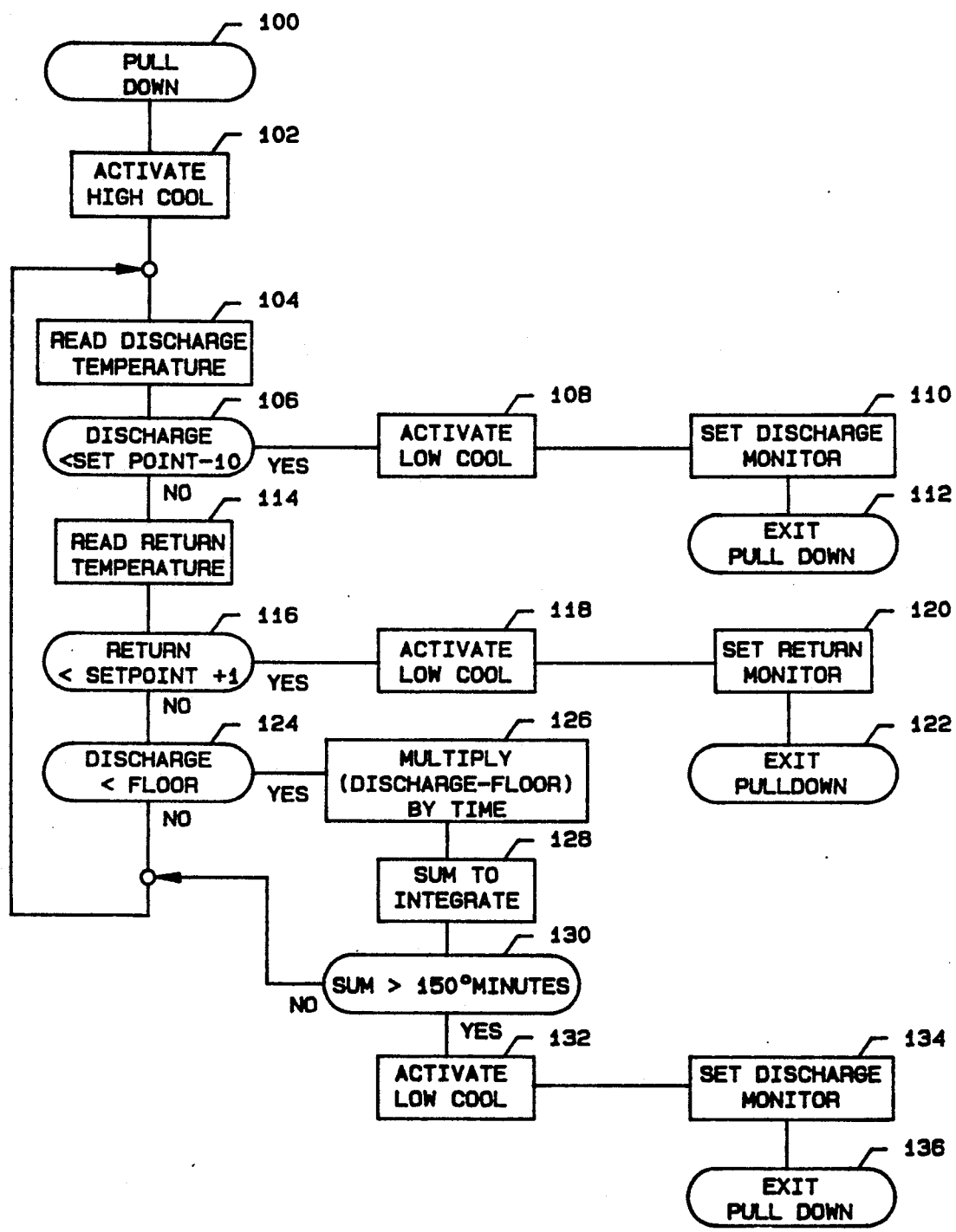
FIG. 2 is a flow chart of the logic of the present invention.

FIG. 2 is flowchart of the operation of the pull down mode in accordance with the preferred embodiment of the present invention. The pull down mode is entered at element 100. Element 102 activates the high cool mode of the refrigeration system 10 (see also FIG. 1). In the pull down mode, refrigeration system 10 operates at its maximum cooling capacity with modulation valve 54 completely open.

The discharge air temperature is read via discharge air temperature sensor 94 at element 104. If the discharge air temperature is more than ten degrees below the set point, element 106 routes control to element 108 which deactivates the high cool mode and activates the low cool mode of refrigeration system 10. In the low cool mode, modulation valve 54 is used to control the cooling capacity. Element 110 sets the discharge monitor before exiting pull down mode at element 112. This indicates that the pull down mode was terminated as a result of reading the discharge air temperature sensor. Such an indication implicitly relates the capacity of refrigeration system 10 to the thermal loading of the particular cargo, refrigerated space volume, ambient conditions, etc.

If the pull down mode is not terminated as a result of the discharge air temperature sensor reading by elements 106 through 112, it is because the measured discharge air temperature is greater than the set point minus ten degrees. Control is transferred to element 114, which reads the output of return air temperature sensor 91. If the return air temperature is less than the set point plus 1, element 116 routes control to element 118 which deactivates high cool mode and activates low cool mode. By setting the return monitor, element 120 indicates that the pull down mode was terminated by reading the return air temperature sensor. Exit is had via element 122.

If the pull down mode is not terminated by either of the normal termination conditions, element 124 determines whether the discharge air temperature is less than the floor temperature. If not, control is returned to element 104 to again search each of the pull down mode termination conditions.

If element 124 determines that the discharge temperature is less than the floor temperature, element 126 multiplies the difference between the discharge temperature and the floor temperature by the time. Integration is performed by element 128. Element 130 determines whether the integrated sum is greater than 150 degree minutes. If not, control is returned to element 104 for reconsideration of each of the three termination conditions.

If element 130 determines that the integrated sum is greater than 150 degree minutes, the pull down mode will be terminated as a safety measure. Element 132 deactivates the high cool mode and activates the low cool mode. Element 134 sets the discharge monitor, and exit is obtained via element 136.

Figure 3:
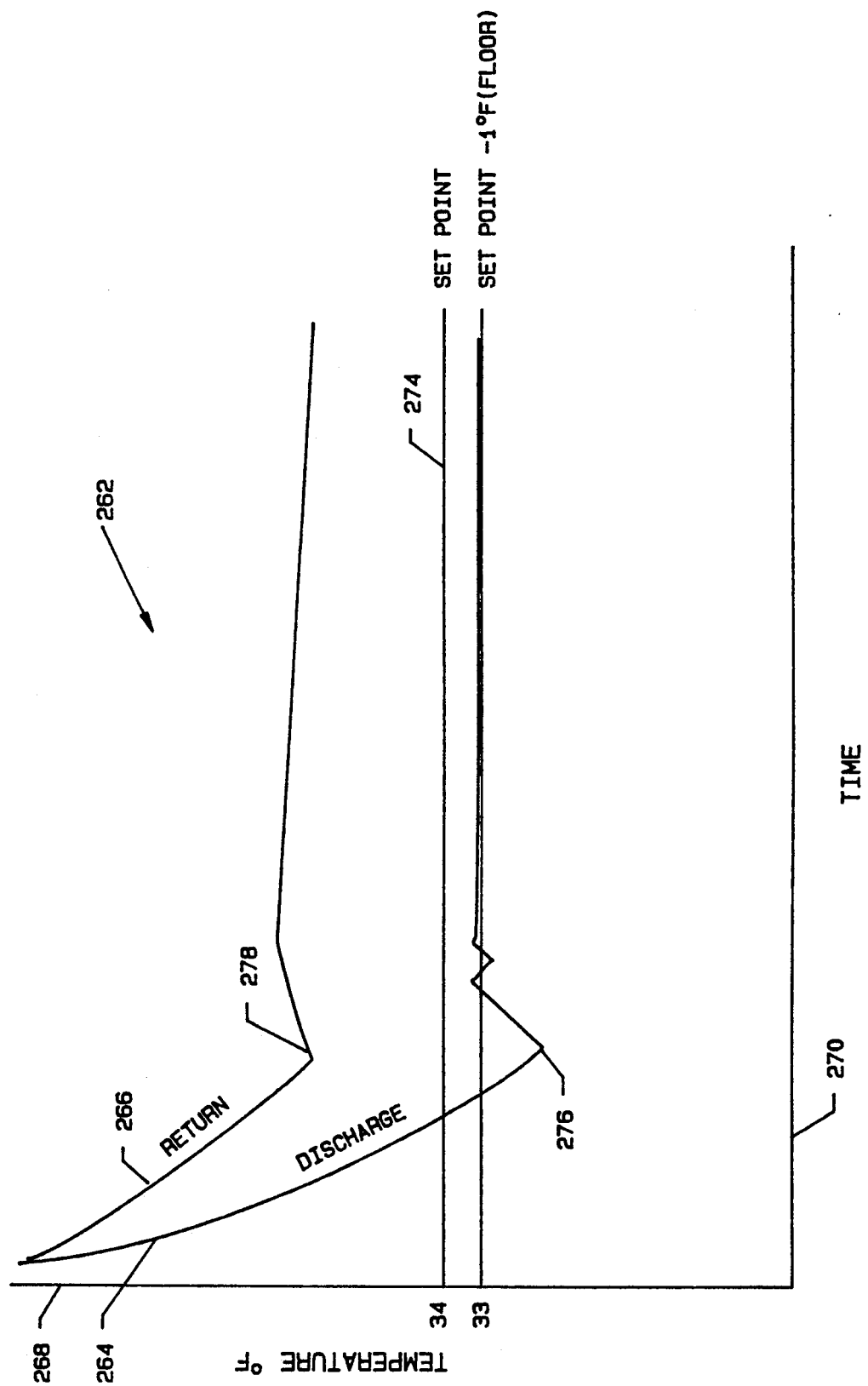
FIG. 3 is a graphical representation of the two normal termination conditions.

FIG. 3 is a graphical representation 262 of the two normal conditions under which the pull down mode is terminated. The graph shows temperature 268 as a function of time 270. In this particular situation, and not to be considered as limiting of the present invention, the set point 34 is established at 34°.

A first termination condition concerns discharge temperature 264 shown during the pull down mode. Termination of the pull down mode may occur whenever discharge temperature 264 is more than ten degrees below set point 34 as shown at point 276. This results in a setting of the discharge monitor (see also element 106 of FIG. 2).

The second normal termination condition occurs when return air temperature 266 becomes less than one degree greater than set point 274 as represented by point 278. This second termination condition results in setting of the return monitor (see also element 116 of FIG. 2).

Having thus described the preferred embodiments of the present invention, those of skill in the art will readily appreciate that additional embodiments may be employed without deviating from the scope of the claims hereto attached.

We claim:

1. A refrigeration system control apparatus comprising:
    a. means for initiating a pull down mode of operation;
    b. a plurality of sensors for monitority a plurality of parameters during said pull down mode wherein said plurality of sensors includes a discharge air temperature sensor;

c. means for comparing each of said plurality of parameters to a different predetermined standard to produce a plurality of comparisons including second means for determining whether discharge air temperature is less than a predetermined set point minus ten degrees and including second means coupled to said second determining means for deactivating said pull down mode whenever said second determining means indicates that said discharge air temperature is less than a predetermined set point minus ten degrees; and means responsively coupled to said comparing means for terminating said pull down mode in response to a one of said plurality of comparisons.

2. An apparatus according to claim 1 wherein said plurality of sensors further comprises a return air temperature sensor.

3. An apparatus according to claim 1 or claim 2 further comprising means for discontinuing said pull down mode whenever the difference between said discharge air temperature and a predetermined floor temperature multiplied by time is greater than a predetermined integral.

4. An apparatus according to claim 3 wherein said predetermined integral is 150 degree minutes.

5. An apparatus according to claim 1 wherein said comparing means further comprises:

a. first means for determining whether return air temperature is less than a predetermined set point plus one degree; and b. first means coupled to said first determining means for deactivating said pull down mode whenever said first determining means indicates that said return air temperature is less than said predetermined set point plus one degree.

6. An apparatus according to claim 2 wherein said comparing means further comprises:

a. first means for determining whether return air temperature is less than a predetermined set point plug one degree; and first means coupled to said first determining means for deactivating said pull down mode whenever said first determining means indicates that said return air temperature is less than said predetermined set point plus one degree.

7. An apparatus according to claim 5 or claim 6 further comprising means for discontinuing said pull down mode whenever the difference between said discharge air temperature and a predetermined floor temperature multiplied by time is greater than a predetermined integral.

8. An apparatus according to claim 7 wherein said predetermined integral is 150 degree minutes.

9. A method of terminating a pull down mode of a heat exchange system of a temperature controlled space comprising:

a. monitoring a first parameter of said temperature controlled space;

b. terminating said pull down mode if aid first parameter coincides with a first predefined condition;

c. monitoring a second parameter of said temperature controlled space;

d. terminating said pull down mode if said second parameter coincides with a second predefined condition;

e. computing a third parameter of said temperature controlled space; and f. terminating said pull down mode if said third parameter coincides with a third predefined condition.

10. An apparatus for refrigerating a space comprising:

a. means for initating a pull down mode of operation;

b. a return air temperature sensor;

c. a discharge air temperature sensor;

d. means responsively coupled to said initiating means and said return air temperature sensor for terminating said pull down mode of operation whenever said return air temperature is less than a setpoint plus a first predetermined number; and e. means responsively coupled to said initiating means and said discharge air temperature sensor for terminating said pull down mode of operation whenever said discharge air temperature is less than said setpoint minus a second predetermined number.

11. An apparatus according to claim 10 wherein said first predetermined number is smaller than said second predetermined number.

12. An apparatus according to claim 11 further comprising:

a. means for determining duration of said pull down mode of operation; and b. means coupled to said initiating means, said determining means, and said discharge air temperature sensor for terminating said pull down mode of operation whenever the integral over time of a floor temperature minus said discharge air temperature is greater than a predetermined number of degree-minutes.

13. An apparatus according to claim 12 wherein said floor temperature is about 33 degrees fahrenheit.

14. An apparatus according to claim 13 wherein said setpoint is larger than said floor temperature.

15. An apparatus according to claim 14 wherein said predetermined number of degree-minutes is 150.

* * * * *